Sept. 22, 1959 H. W. PATTON 2,905,818
HALF-WAVE PHASE DISCRIMINATOR
Filed Oct. 31, 1955

INVENTOR.
HENRY W. PATTON
BY
ATTORNEYS

United States Patent Office 2,905,818
Patented Sept. 22, 1959

2,905,818

HALF-WAVE PHASE DISCRIMINATOR

Henry W. Patton, Middle River, Md., assignor to Collins Radio Company, Cedar Rapids, Iowa, a corporation of Iowa Application October 31, 1955, Serial No. 543,964

1 Claim. (Cl. 250—27)

This invention relates to phase discriminators and more particularly to bridge-type phase discriminators.

Bridge-type phase discriminators are well known in the art, and one such discriminator circuit is described in Alternating Current Bridge Methods by B. Hague (Pitman Publishing Company, London, 1938), page 237.

This invention provides an improvement in such a bridge-type phase discriminator. The phase discriminator circuit is modified by the addition of a diode which may be called a diverter diode. The diverter diode prevents unbalance which was present in the prior bridge-type phase discriminators during the non-conducting period. This unbalance was primarily due to the inability of the diodes in the phase discriminator circuit to block the commutating voltage.

It is an object of this invention to provide a bridge-type phase discriminator which will not deliver an output signal during the non-conducting cycle of the phase discriminator.

Figure 1:
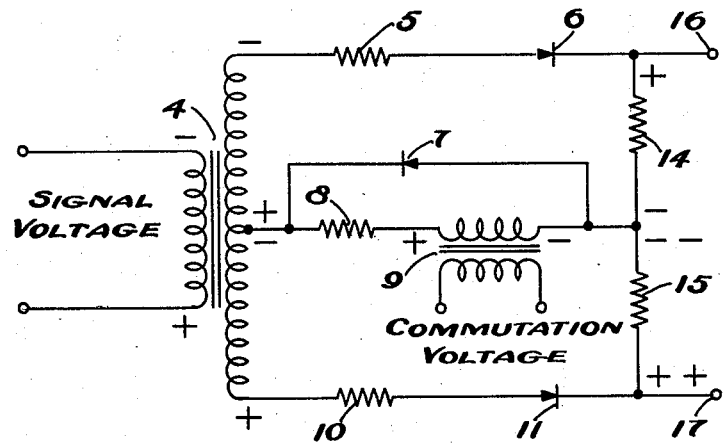
Figure 2:
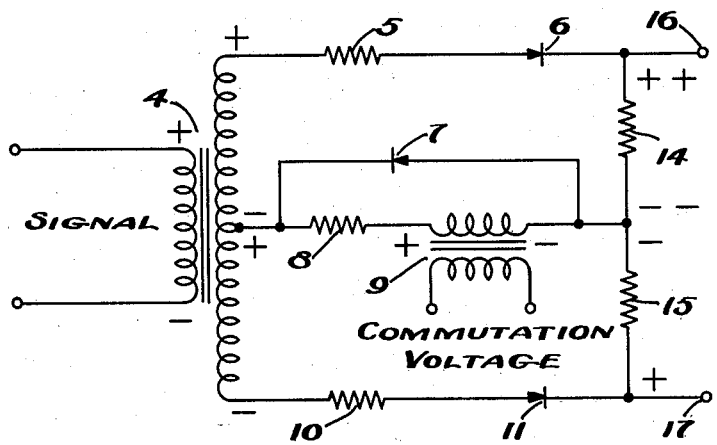

Other objects of this invention will become apparent when the following description is read in conjunction with the drawings, in which:

Figure 1 is a schematic representation of a bridge-type phase discriminator with one polarity of input signal during a conducting cycle, and Figure 2 is a schematic representation of a bridge-type phase discriminator with the other polarity of input signal during a conducting cycle.

The operation of the bridge-type phase discriminator circuit of this invention will be explained with particular reference to Figure 1. The operation of Figure 1 is known as the conducting cycle of the bridge and will occur with the voltages having polarities as indicated in Figure 1. With a signal voltage of the polarity shown in Figure 1 applied to the transformer 4, voltages will be developed in the center-tapped secondary with polarities as shown in Figure 1. Now, if the commutation voltage has a polarity as shown in Figure 1, conduction will occur. As shown in Figure 1, the value of the commutation voltage subtracts from the value of the voltage generated in the upper half of the center-tapped secondary. With these voltages present, a current will flow in the upper half of the center-tapped secondary in a circuit including resistor 5, diode 6, resistor 14, and resistor 8. Simultaneously in the lower half of the phase discriminator circuit, the value of the commutation voltage adds to the value of the voltage developed in the lower half of the center-tapped secondary. This voltage will cause a current to flow in the circuit including resistor 10, diode 11, and resistor 15. The current flow in the lower half of the phase discriminator circuit will be greater than the current flow in the upper half due to the greater voltage impressed in the lower half. This difference in the current flow will cause a greater voltage to be developed across resistor 15 than across resistor 14. With this situation prevailing, an output signal is developed with terminal 17 positive with respect to terminal 16.

Figure 2 illustrates the same phase discriminator circuit as described for Figure 1, except that the polarity of the signal voltage is reversed. It is noted that the polarity of the commutation voltage remains the same. This is another conducting cycle and the operation of the circuit is identical to that described in Figure 1 except that a greater voltage is now developed across resistor 14 rather than resistor 15.

The operation of this phase discriminator circuit has been described only with respect to the conducting cycle. The problem which this invention solves occurs during the non-conducting period or the time when the polarity of the commutation voltage is opposite to the polarity shown in Figures 1 and 2. With a commutation voltage polarity opposite to that shown in Figures 1 and 2, diodes 6 and 11 were priorly required to block this commutation voltage. Thus it was necessary to accurately match the leakage and other characteristics of diodes 6 and 11 for maximum operational efficiency. With all diodes having a certain minimum leakage, some current flowed through diodes 6 and 11. Inasmuch as the leakage characteristics of diodes vary with temperature and other parameters, a different current flowed through resistor 14 than through resistor 15. With the leakage current between diodes 6 and 11 unbalanced, a component of the commutation voltage appeared across resistors 14 and 15. The current which flowed through resistors 14 and 15 was unequal and an output signal of one polarity or another appeared across terminals 16 and 17. This output signal was erroneous and most undesirable.

This invention provides an additional unilateral conduction device such as a diode 7 connected across resistor 8 and the secondary of the transformer 9. With diode 7 added to the phase discriminator, any current which is developed by the commutation voltage in the non-conducting period flows in the diverter circuit through diode 7, resistor 8, and the secondary of the transformer 9. Resistor 8 limits the current flow during the non-conducting period. No commutation voltage reaches diodes 6 and 11 and no leakage results. With no leakage current in either diode 6 or diode 11, no unbalanced current condition will exist. With no leakage current, no voltage will be developed across resistors 14 or 15 and no spurious output signal will be generated. Thus, during the non-conducting period of this phase discriminator, accurate balance is maintained in the output circuit and no erroneous signals are generated. This invention thus provides an accurately-balanced phase discriminator of the half-wave type.

Although this invention has been described with respect to a particular embodiment thereof, it is not to be so limited as changes and modifications may be made therein which are within the full intended scope of the invention, as defined by the appended claim.

What is claimed is:

In a phase discriminator circuit of the half wave type for operation with alternating currents and including a first transformer having a primary winding and a center tapped secondary winding, a second transformer having a primary winding and a secondary winding, output connections, a plurality of resistance elements, a plurality of unilateral conduction devices, said resistance elements and said unilateral conduction devices connected to form two similar circuits, each of which includes the secondary winding of said second transformer, an input signal applied to the primary winding of said first transformer and a commutating signal applied to the primary of said second transformer whereby said plurality of unilateral conduction devices are sequentially biased in forward and reverse states by said commutation signal, means for eliminating current flow through said plurality of unilateral conduction devices during said reverse bias states comprising a further unilateral conduction device connected in parallel with said secondary of said second transformer, said further device being poled so as to forwardly conduct in an opposite direction to that of said plurality of unilateral conduction devices in said circuit to provide a low impedance diverter path for said commutation signal during said reverse bias states.

References Cited in the file of this patent

UNITED STATES PATENTS

| | | |
|---|---|---|
| 1,960,047 | Bedford | May 22, 1934 |
| 2,397,337 | Clough | Mar. 26, 1946 |
| 2,527,096 | Howe | Oct. 24, 1950 |
| 2,535,147 | Markusen | Dec. 26, 1950 |
| 2,677,054 | Cohen | Apr. 27, 1954 |
| 2,757,297 | Evans et al. | July 31, 1956 |
| 2,774,038 | Stavis | Dec. 11, 1956 |